United States Patent

Dirks

[15] 3,670,402
[45] June 20, 1972

[54] MULTI-STATION MACHINE FOR AUTOMATIC PERFORMANCE OF SEQUENTIAL OPERATIONS

[72] Inventor: Chauncey L. Dirks, Rochester, Mich.

[73] Assignee: General Motors Corporation, Detroit, Mich.

[22] Filed: June 26, 1970

[21] Appl. No.: 50,167

[52] U.S. Cl..................................29/563, 29/33 P, 198/221
[51] Int. Cl.........................................B23q 7/04, B65g 25/08
[58] Field of Search.................29/33 A, 33 P, 563, 33 R; 90/21 R, 21 A, 83; 408/70

[56] References Cited

UNITED STATES PATENTS

| | | | |
|---|---|---|---|
| 2,249,230 | 7/1941 | Schafer | 29/33 R X |
| 2,583,968 | 1/1952 | Rosseau | 198/221 X |
| 1,437,410 | 12/1922 | Evans et al. | 198/221 X |

Primary Examiner—Gil Weidenfeld
Attorney—J. L. Carpenter and Robert J. Outland

[57] ABSTRACT

In preferred form, a cylinder head casting defining machine having a plurality of work stations through which the cylinder head castings are moved on guide rails by a crank operated harmonic transfer mechanism which combines fast transfer from station to station with slow initial and terminal portions of the movement so that excessive shocks and part overrun are avoided. A pneumatic tool actuating mechanism is mechanically interconnected with the transfer means to positively time operation of the definning tools to occur during the return stroke of the transfer mechanism.

2 Claims, 7 Drawing Figures

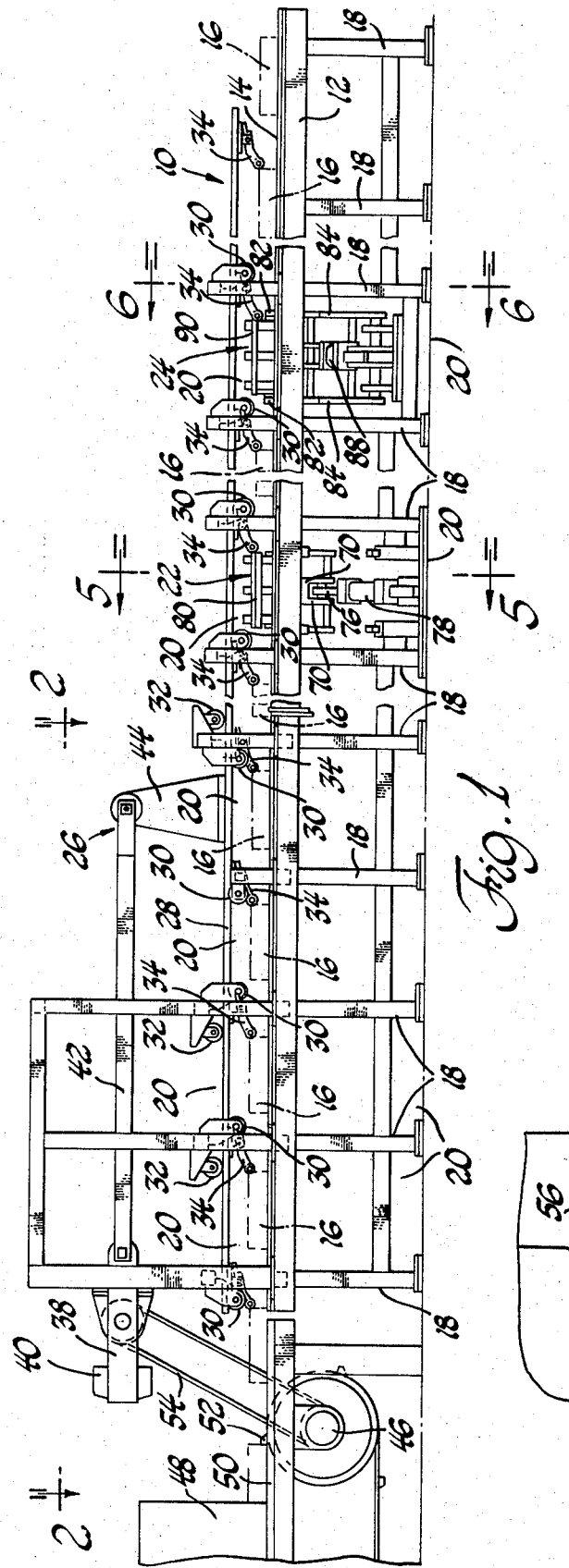
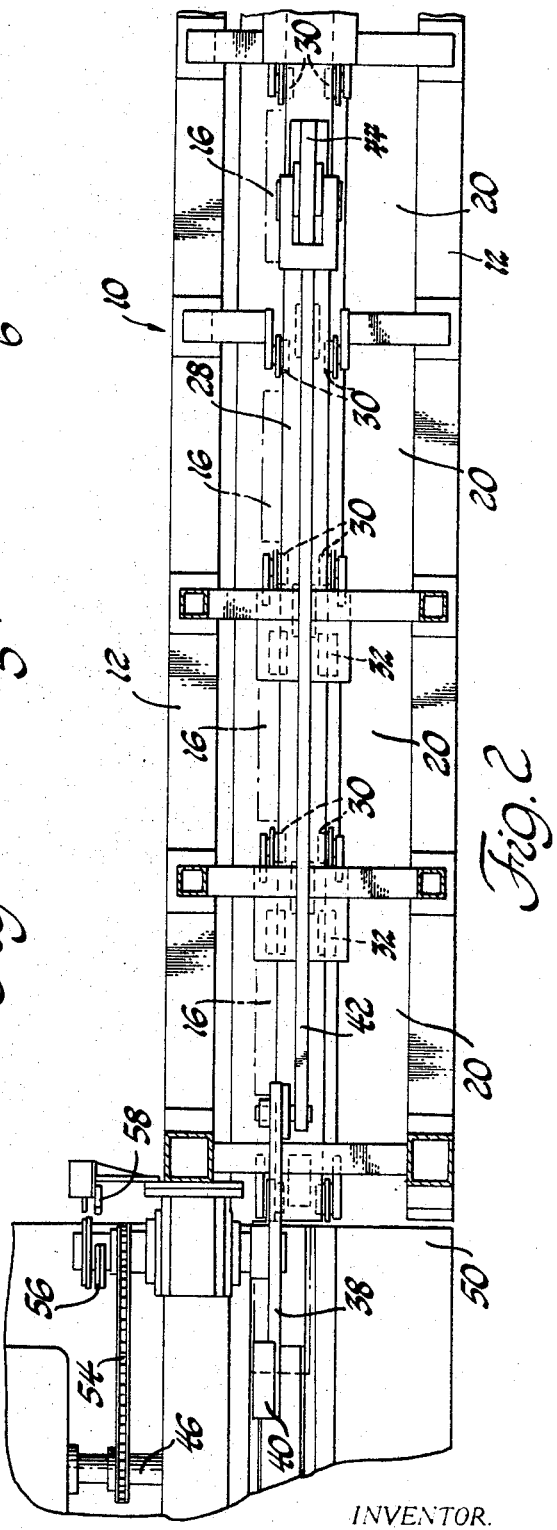

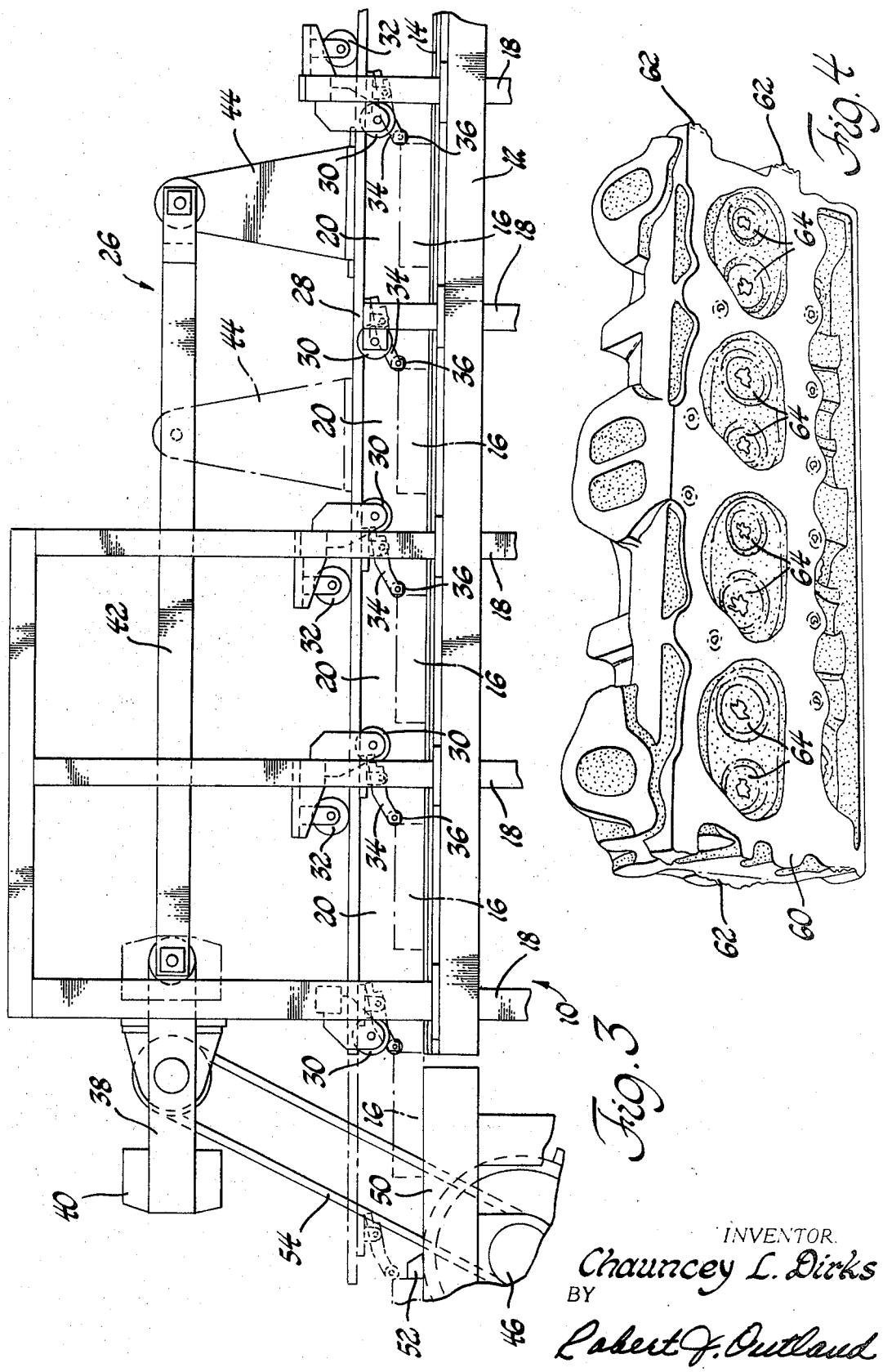

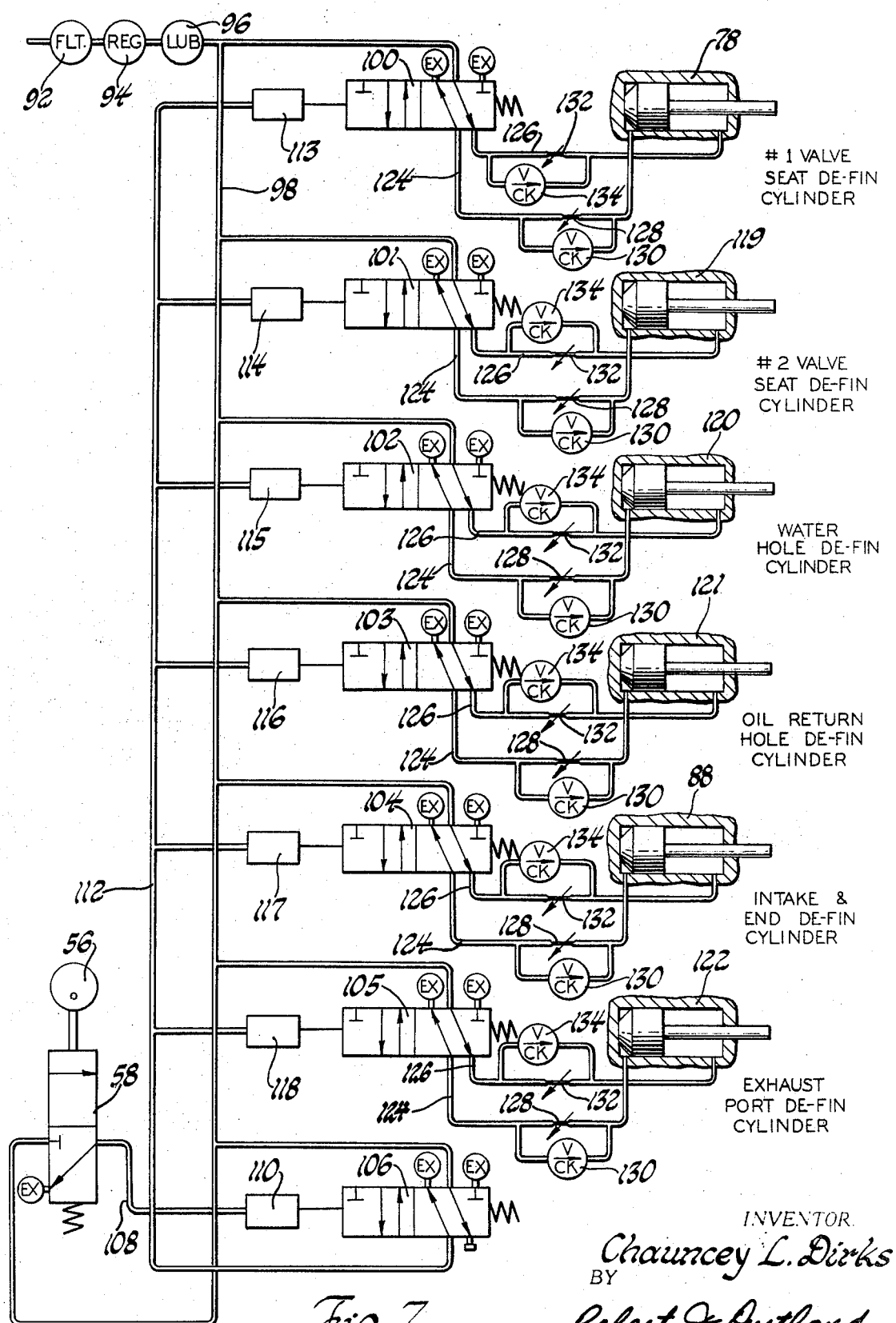

MULTI-STATION MACHINE FOR AUTOMATIC PERFORMANCE OF SEQUENTIAL OPERATIONS

BACKGROUND OF THE INVENTION

This invention relates to multi-station machines for automatically performing a series of sequential operations on a plurality of individual parts and, in its more particular aspects, to machines for removing fins from castings, such as cylinder head castings.

In the art relating to multi-station machines for performing a series of mechanical operations on individual parts, it is known to provide automatic intermittent transfer mechanisms for moving the parts from station to station. Such mechanisms often include quite elaborate control arrangements to permit the transfer of the parts to take place only when the operations on the parts at the various stations have been completed. When high transfer speeds are involved, intermittent transfer mechanisms often require special stop devices to prevent the individual parts from riding past their intended station locations. Satisfying all the requirements of high speed transfer mechanisms with interconnected tool control has, in general, required relatively complex mechanisms.

SUMMARY OF THE INVENTION

The present invention provides a multi-station machine in which a simple crank type drive is used to provide a harmonic motion for an intermittent transfer mechanism which operates at high transfer speeds but does not require special stopping devices for the parts at the various stations. In addition, mechanical interconnection of the crank mechanism with the operating tool controls provides for all machine operations to take place on the return stroke of the transfer mechanism so that a simple continuously operating drive may be utilized.

In specific form, the machine includes guide rails traversing a plurality of work stations and arranged to carry individual cylinder head castings from which casting fins are removed by special tools provided at the various work stations. A longitudinal transfer bar and simple gravity latches which advance the castings on the forward stroke and ride over the castings on the return stroke are utilized as main components of the transfer mechanism.

These and other advantages of the invention may be more fully understood from the following description of a preferred embodiment, taken together with the accompanying drawings.

BRIEF DESCRIPTION OF THE DRAWINGS

In the drawings:

FIG. 1 is a front elevational view of a multi-station cylinder head definning machine having transfer and tool means according to the invention and showing exemplary portions thereof;

FIG. 2 is a plan view showing the transfer mechanism drive portions of the machine of FIG. 1 as viewed in the direction of the arrows 2—2;

FIG. 3 is an enlarged elevational view showing details of the drive and transfer mechanism of the machine of FIG. 1;

FIG. 4 is a pictorial view illustrating a cylinder head casting of the type from which casting fins are to be removed by the machine of FIG. 1;

FIG. 7 is a schematic diagram of the pneumatic control and tool actuating system for the machine of FIG. 1 showing its mechanical interconnection with the transfer drive mechanism.

DESCRIPTION OF THE PREFERRED EMBODIMENT

Figure 5:
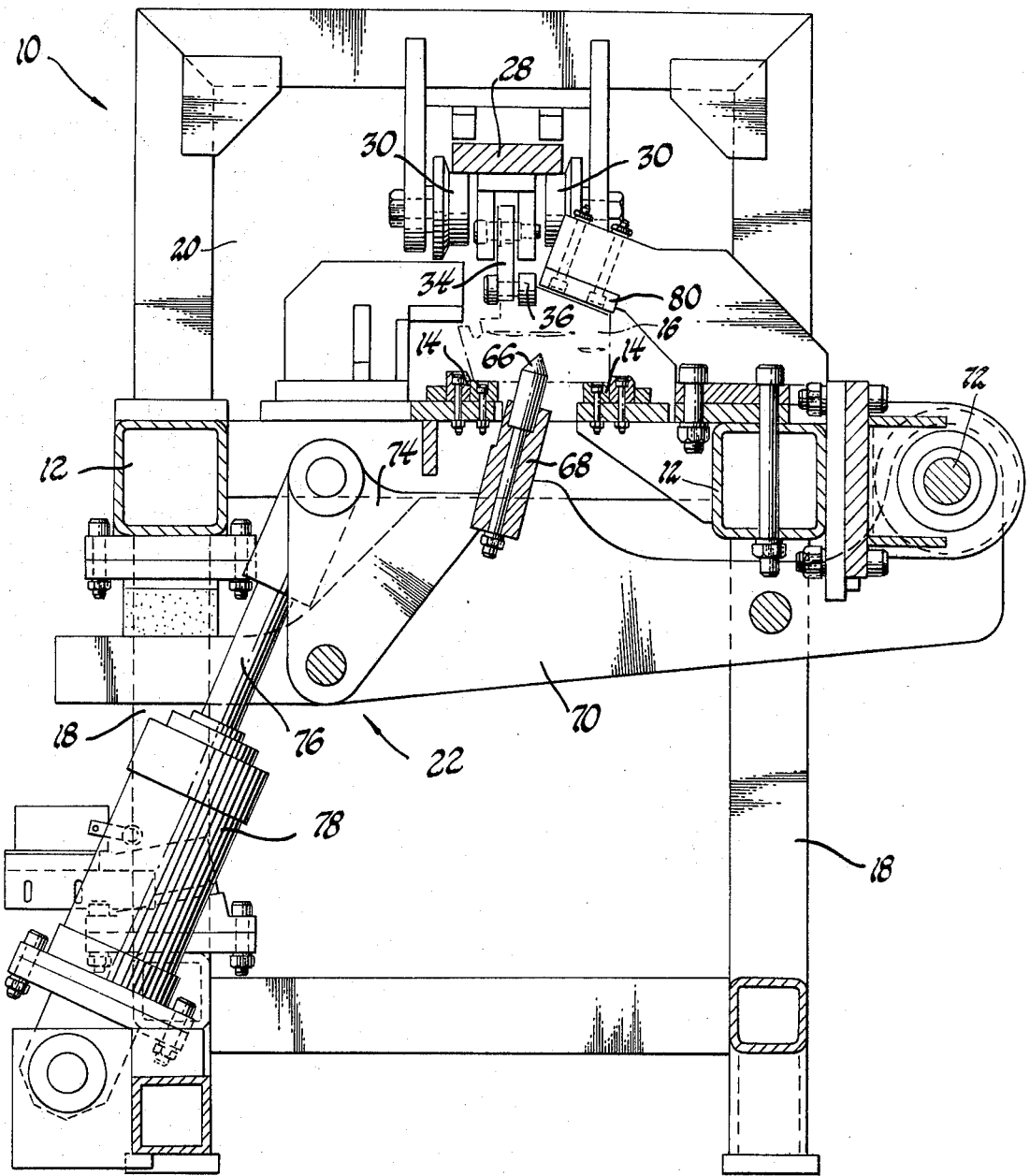
FIG. 5 is a cross-sectional view taken in the plane indicated by the line 5—5 of FIG. 1 and showing details of one of the casting definning work stations.

Referring now to the drawings in detail, numeral 10 generally indicates a multi-station cylinder head casting definning machine formed according to the invention. Machine 10 includes a fabricated steel frame 12 on which is carried a pair of built-up steel guide rails 14 which extend parallel to one another the entire length of the frame 12 and provide both guide and support means on which a plurality of cylinder head castings 16 may be carried and moved from station to station through the machine.

Frame 12 is provided with a plurality of vertically extending legs 18 which support the frame and guide rails 14 and divide the frame into a plurality of equally spaced longitudinally aligned work stations 20, only certain of which are shown in the drawings. Some of the work stations contain no tooling and thus are referred to as "idle" stations, while at others tools and actuating means are provided to perform various fin removal operations on the cylinder head castings. In the present machine, seven active work stations are actually utilized. However, for simplicity the drawings show only two of these: one having a valve seat definning mechanism 22 and another having an end definning mechanism 24.

Movement of the cylinder heads from station to station along the guide rails and through the machine is accomplished by means of a transfer mechanism generally indicated by numeral 26. The transfer mechanism comprises a transfer bar 28 which extends longitudinally substantially the length of the frame 12 and is reciprocally carried thereby on support rollers 30 and maintained in position by holddown rollers 32.

The transfer bar 28 carries a plurality of pivotally mounted latch members 34 which are equally spaced along the lower surface thereof and are gravity actuated downwardly into positions in which they are engageable with the ends or other suitable portions of the individual cylinder head castings for moving them forward from station to station through the machine (from left to right, as shown in FIGS. 1, 2, 3). Latches 34 each include a roller member 36 which, on the return stroke of the transfer bar, engages a high point of the cylinder head casting, causing the latches to lift up and ride over the castings on their return to the initial position of the transfer stroke. The spacing of the latch members along the transfer bar is equal to the distance between the individual work stations.

Reciprocation of the transfer bar in a harmonic motion is provided by a crank 38 counterweighted as at 40 and connected through a link 42 and connector member 44 with the transfer bar 28. The crank throw is sized to provide a transfer bar stroke, or movement, of just slightly greater than the work station spacing to assure engagement of the latches with the castings at the beginning of each transfer stroke. The crank 38 and connecting link 42 are arranged to be parallel with the transfer bar 28 at the ends of its stroke so that a true harmonic reciprocating motion is provided. A harmonic drive has the advantage that even though a fast transfer speed is utilized, the rate of travel of the transfer bar will be very slow towards the beginning and ending of each stroke. In this way, the shock load, upon engagement of the latches with the cylinder head castings, is reduced and, even more important, the rate of movement of the individual cylinder heads is slowed at the end of each stroke so that no over-travel occurs. Thus, the gravity latches 34 are sufficient in themselves to properly position the cylinder head castings at each station and no special stopping or locating devices are required.

Drive of the crank 38 for the transfer mechanism is provided in this instance from the tail shaft 46 of an associated grinding machine 48, which is directly fed by the definning machine of this invention. The arrangement is such that the cylinder head castings are transferred from the definning machine directly onto the table 50 of the grinder, where they are picked up and moved through the grinder by the lugs 52 of the grinder's transfer mechanism. The grinder tail shaft 46 is connected by a chain 54 with crank 38 so as to drive the harmonic transfer mechanism of the definning machine while at the same time maintaining the transfer mechanism in proper timing with that of the grinder 48. A cam 56 attached on the shaft of crank 38 (as shown in FIG. 2) is arranged to intermittently engage a pneumatic pilot valve 58 for controlling the operation of the various tools of the definning machine in a manner to be subsequently described.

Referring now to FIG. 4 of the drawings, there is shown a cylinder head casting 60 of the type adapted to be defined by the machine of this invention. In the form shown in the figure, casting 60 includes casting fins 62 extending from the opposite ends thereof, as well as additional casting fins 64 extending interiorly of the valve seats. Additional fins, not shown, may also be disposed on various other surfaces of the casting. The definning machine of this invention acts through various trimming and punching tools to remove excessive portions of the cylinder head casting fins in preparation for passing of the cylinder head casting through the grinding machine 48, where the fins are further reduced to a predetermined dimension suitable for final machining of the cylinder head.

FIG. 5 of the drawings illustrates in detail one of the work sections of the definning machine whereby the mechanism 22 for removing fins from certain of the cylinder head valve seats is located. This mechanism includes a plurality of punches 66 carried in a tool holder 68 which is mounted between a pair of support arms 70. Arms 70 are pivotally supported at 72 on the frame 12 and are attached through a connecting member 74 with the piston rod 76 of a pneumatic cylinder 78. Movement of the piston rod 76 into and out of cylinder 78 causes the pivotal movement of arms 70 and the consequent movement of punches 66 into and out of the respective valve seat openings of a cylinder head properly located in the station. Suitable stop means 80 are fixed to the machine frame 12 and arranged to oppose an upper surface of the cylinder heads being acted upon so as to prevent upward movement of the heads during the punching operation.

Figure 6:
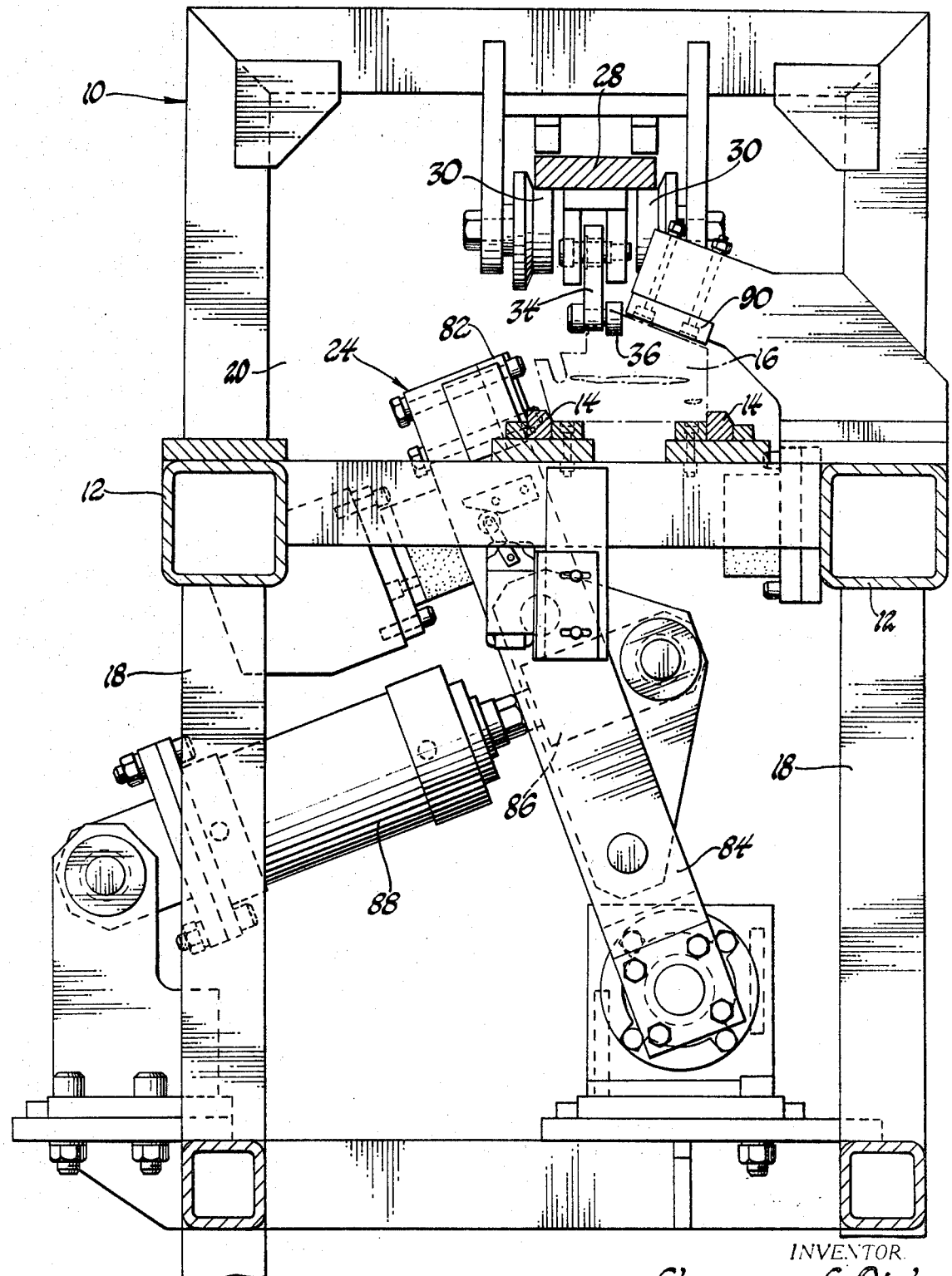
FIG. 6 is a cross-sectional view taken in the plane indicated by the line 6—6 of FIG. 1 and showing details of another of the casting definning work stations.

FIG. 6 of the drawings illustrates the end definning mechanism 24 found at another of the machine work stations. This mechanism comprises a plurality of cutoff tools 82 which are carried on arms 84 pivotally mounted on the machine frame 12. Arms 84 are, in turn, connected with the piston rod 86 of another pneumatic cylinder 88, actuation of which moves the pivot arms so as to pass the cutoff tools across the end faces of any cylinder head in the station to thereby cut or break off the fins at the ends thereof. Stop means 90, which are similar to the stop means 80 of the previously described station, are provided to prevent movement of the cylinder head during the cutting operation.

Referring now to FIG. 7 of the drawings, there is shown a schematic diagram of the control and tool actuating mechanism for the machine of the present invention. Pressurized air from the factory source is provided through a filter 92, pressure regulator 94 and lubricator 96 to a line 98, which feeds a plurality of spring returned pneumatic spool valves 100 – 106, plus the pneumatic pilot valve 58. Valve 58 controls the feed of air through line 108 to the actuator 110 for spool valve 106. Valve 106, in turn, controls the feed of air to line 112, which feeds the actuators 113 – 118 of spool valves 100 – 105, respectively. Each of the latter spool valves controls the feed of air to and from its respective one of the pneumatic cylinders 78, 88 and 119 – 122.

Spool valves 78, 88 and 119 – 122 are connected with their respective pneumatic cylinders by actuating lines 124 and return lines 126. Each of the actuating lines 124 includes a variable orifice 128 bypassed by a check valve 130 having free flow in a direction toward the cylinder. Return lines 126 each also includes a variable orifice 132 bypassed by a check valve 134, also having free flow in the direction of the cylinder.

In operation, rotation of the grinder tail shaft drives crank 38 through chain 54, which causes the harmonic reciprocation of the transfer bar 28. Upon forward movement of the transfer bar (from right to left in FIGS. 1 – 3) the various gravity latches 34 engage cylinder head castings at the respective stations and move them to their proper positions at the next stations. Upon the return stroke, the gravity latches are lifted up by rollers 36 and ride over the cylinder head castings, which remain in their stations until the next forward stroke of the transfer bar.

During the transfer bar return stroke, cam 56 actuates pilot valve 58 to permit a flow of air therethrough from line 98 to the actuator 110 for spool valve 106. This actuates the spool valve, permitting air flow from line 98 through line 112 to actuators 113 – 118 of the various spool valves 100 – 105. Actuation of these valves feeds air through lines 124 to the actuating sides of the pneumatic cylinders 78, 88 and 119 – 122, causing the cylinders to actuate the various definning tool mechanisms at their various work stations.

After a predetermined movement of the transfer mechanism on the return stroke, cam 56 moves away from pilot valve 58, causing it to be returned to its inactive position. This cuts off air flow to actuator 110 and permits spool valve 106 to close, in turn cutting off air flow to actuators 113 – 118. Spool valves 100 – 105 then return to their initial positions, causing air pressure to be introduced to the return sides of the pneumatic cylinders through lines 126 and to be exhausted from the actuating sides through lines 124 as controlled by variable orifices 128. The timing of the actuation and return strokes is arranged such that the cylinders are completely returned to their initial positions by the time the transfer mechanism reaches the end of its return stroke. In this way, the next forward movement of the transfer mechanism will move the cylinder head castings to the next station without any interference from the various defining tool mechanisms.

While this invention has been described by reference to a specific embodiment, it is not intended that the inventive concept should be limited thereby but that it should be given its full scope as defined in the following claims.

I claim:

1. A multi-station machine for automatically sequentially performing a series of separate operations on any number of individual parts, said machine comprising
   a main frame defining a plurality of aligned equally spaced stations,
   guide means on said frame for supporting a plurality of work pieces and arranged to guide such work pieces linearly along said frame in and between said stations,
   mechanical transfer means including a crank mechanism, a transfer bar disposed above and extending longitudinally for substantially the length of said guide means and connected with said crank mechanism so as to be reciprocably driven thereby with a motion at least approaching harmonic motion, a plurality of work piece engaging latches pivotally carried on said transfer bar, said latches being gravity actuated to engage such work pieces for movement in one direction along said guide means and pivoting to a non-engaging position during each return movement to sequentially advance such work pieces from station to station along said guide means,
   a plurality of operating means including pneumatic cylinders located at various of said stations, said operating means being adapted to perform a plurality of different mechanical operations on said work pieces, each said operating means performing a different one of such operations at its respective station, and
   control means connected with said operating means to control the operation thereof, said control means comprising a cam mechanically connected with said mechanical transfer means and a pilot valve connected to control the supply of air to said pneumatic cylinders, said cam being arranged to actuate said pilot valve in timed relation to the stroke of said transfer bar such that the various operating means are simultaneously actuated to perform their respective operations during the return movement of said transfer means and said operating means are not in operation during the movement of such work pieces from station to station.

2. In a multi-station machine for automatically removing fins from a series of individual castings,
   a main frame defining a plurality of longitudinally aligned equally spaced work stations,
   guide rails extending longitudinally on said frame for supporting a plurality of individual castings thereon and guiding said castings linearly along said frame in and between said work stations, mechanical transfer means including a continuously rotatable crank mechanism, a transfer bar reciprocably carried on rollers above said guide means and extending longitudinally for substantially the total length thereof, said transfer bar being connected with said crank mechanism so as to be driven thereby with a continuous harmonic motion, reciprocating through a stroke no less than the spacing of adjacent work stations, a plurality of latches pivotably carried beneath said transfer bar spaced equally therealong at distances equal to the spacing of adjacent work stations, said latches being downwardly movable by gravity into casting engaging positions for engagement with and movement of said castings from one station to the next during forward travel of said transfer bar and said latches being pivotable out of said casting engaging positions and adapted to ride over said castings without moving them upon the return movement of said transfer bar, such actions causing said castings to be sequentially advanced from station to station along said guide rails, a plurality of definning tools located at various ones of said work stations and each connected with fluid actuating means by which said tools are operated to sequentially act upon each of said casting at the various work stations to cut excess fins from various locations thereon and fluid control means connected with said fluid actuating means to control the operation thereof, said fluid control means being mechanically interconnected with said mechanical transfer means such that said fluid actuating means are controlled to simultaneously actuate said definning tools to perform their respective operations during the return movement of said transfer bar and to avoid actuation of said tools during the forward travel of said transfer bar.

* * * * *

PO-1050
(5/69)

UNITED STATES PATENT OFFICE
CERTIFICATE OF CORRECTION

Patent No. 3,670,402   Dated June 20, 1972

Inventor(s) Chauncey L. Dirks

It is certified that error appears in the above-identified patent and that said Letters Patent are hereby corrected as shown below:

In the Abstract, Line 1, "defining" should read --definning--.

Col. 1, Line 51, "defining" should read --definning--.

Col. 3, Line 5, "defined" should read --definned--; Line 18, "sections" should read --stations--; Line 18, "whereby" should read --wherein--; Line 36, "on", second occurrence, should read --to--.

Col. 4, Line 26, "defining" should read --definning--.

Signed and sealed this 9th day of January 1973.

(SEAL)
Attest:

EDWARD M. FLETCHER, JR.
Attesting Officer

ROBERT GOTTSCHALK
Commissioner of Patents